June 11, 1929.    H. O. SIEGMUND    1,717,070
RECTIFYING SYSTEM
Filed Nov. 1, 1921
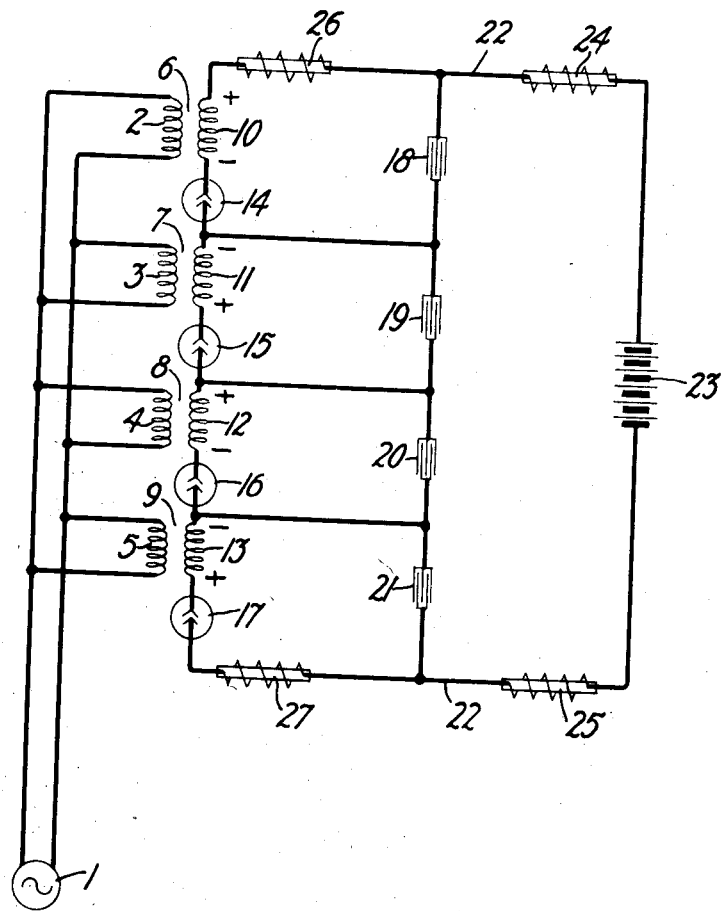
Inventor:
Humphreys O. Siegmund
by C. C. Sprague, Atty.

Patented June 11, 1929.

1,717,070

UNITED STATES PATENT OFFICE.

HUMPHREYS OLIVER SIEGMUND, OF SPRINGFIELD, NEW JERSEY, ASSIGNOR TO WESTERN ELECTRIC COMPANY, INCORPORATED, OF NEW YORK, N. Y., A CORPORATION OF NEW YORK.

RECTIFYING SYSTEM.

Application filed November 1, 1921. Serial No. 512,068.

This invention relates to a system for rectifying alternating electric current.

One object of the invention is to provide an efficient full wave rectifying circuit in which a plurality of rectifying units may be combined to produce a D. C. potential in excess of that obtainable from a single unit.

Another object of the invention is to produce a constant D. C. potential of any desired value from an alternating current by means of a minimum number of rectifying units, any one of which is capable of handling only a fraction of the D. C. potential to be produced.

It is old in the art to so arrange two rectifying units in a circuit as to make use of a full wave of alternating current to produce a D. C. potential of greater value than that applicable to a single unit as, for example, disclosed in the Electrical World for November 15 and 22, 1919, page 937, Fig. 2. One objection to this circuit consists in the fact that the maximum potential obtainable is limited to twice that applicable to a single rectifying unit. Another objection lies in the fact that a simple commercial rectifying unit, consisting of a rectifier in series with the secondary winding of a transformer, cannot be readily adapted to this type of circuit without alteration.

In accordance with the present invention any number of rectifying units, such as commercial units comprising a rectifier in series with the secondary winding of a transformer, are arranged in a series circuit with the load, each unit being shunted by a capacity. Adjacent rectifiers are similarly poled, while adjacent secondary windings are oppositely poled with respect to each other. The capacities cooperate with the rectifying units to smooth out the rectified current, and to store energy during one-half cycle and discharge it to the load during the succeeding half cycle.

Other objects of the invention will be apparent from the more detailed description which follows, taken together with the appended drawing and claims.

In the drawing, an embodiment of applicant's invention is illustrated wherein amplified uni-directional pulses corresponding to each half wave of an alternating current are supplied to a load.

A source 1 of alternating current to be rectified is connected to the primary windings 2, 3, 4, 5 of the transformers 6, 7, 8, 9, the secondary windings 10, 11, 12, 13 of which are arranged in series with each other in such manner that adjacent secondary windings are oppositely poled with respect to each other as shown by the plus and minus signs on the drawing which represent the relative polarities of the secondaries during one-half cycle of the alternating current. The rectifier 14 is connected in series with the winding 10 to form a unit therewith, similarly rectifier 15 is combined with winding 11, rectifier 16 with winding 12, and rectifier 17 with winding 13, each combination forming a rectifying unit such, for example, as is obtainable on the market as a standardized article of commerce. It will be noted that adjacent rectifiers connected in series with windings 10, 11, etc. are similarly poled, that is, are conductive in the same direction. For charging storage batteries of relatively low voltage, it is desirable to make use of gas filled rectifying tubes of the type disclosed, for example, in United States patent to G. S. Meikle, No. 1,182,291, patented May 9, 1916, but it is to be understood that any well-known type of rectifier, such as one of the pure electron discharge type, mercury vapor type, electrolytic type, etc., may be used.

The capacities 18, 19, 20 and 21, shunt units 10, 14; 11, 15; 12, 16; and 13, 17, respectively, and may be electrolytic condensers, pure capacity condensers, or capacity in any well-known form. The load circuit 22 including the storage battery or other load 23 is connected to the terminals of the circuit formed by the units 10, 14; 11, 15; etc., in series. Choke coils 24, 25 may be inserted at the ends of the load circuit 22, adjacent the capacities 18 and 21. Choke coil 26 may be inserted in the loop formed by secondary winding 10, rectifier 14, and condenser 18, adjacent to one terminal of the circuit formed by the plurality of rectifying units in series. A similar choke coil 27 may be placed at the other end of the circuit formed by the plurality of rectifying units in series. Similar choke coils may be placed in the conductors extending between the junction point of the capacities and the junction points of adjacent rectifying units. Such inductances tend to smooth out variations and waves superposed upon the rectified current, and supplement any leakage reactance existing in secondary windings 10, 11, etc. If desired the leakage reactance of the secondary windings 10, 11, etc. may be made of such value as to appreciably suppress "noise" currents, and other waves produced in the rectifying circuit.

The operation of the system is as follows: When a potential is induced in each of the secondary windings 10, 11, etc. as indicated by the plus and minus signs in the drawing, current will flow through rectifiers 14 and 16 in series with condensers 19 and 21, and the load 23. At the same time, condensers 18 and 20 will be charged by the rectified current. During the succeeding half cycle, the potential induced in the secondary windings 10, 11, etc. will be reversed thereby causing rectified current to flow through rectifiers 15 and 17 in series with condensers 18 and 20, and the load 23. On account of the charges accumulated thereon during the previous half cycle, the condensers 18 and 20 will add their potentials to that of the windings 11 and 13, thus giving rise to a rectified potential approximately twice that being impressed by the windings 11 and 13, or four times that impressed by one of said windings. At the same time current flows through the rectifiers 15 and 17 to charge capacities 19 and 21, so that on the succeeding half cycle, when windings 10 and 12 again assume the polarity indicated upon the drawing, the total potential developed at the terminals of the load circuit 22 will be substantially equal to the sum of the potentials impressed by the windings 10 and 12, and capacities 19 and 21, or in other words approximately four times that impressed by one of the secondary windings. It will be apparent that any number of rectifying units with their shunted capacities such, for example, as the units 10, 14 shunted by capacity 18, may be employed in combination in the manner disclosed. For example, the rectifying units 12, 16; and 13, 17, together with capacities 20 and 21, may be omitted or similar units with their shunted capacities may be added to the circuit shown in the manner disclosed.

The invention is not to be construed as limited to the specific circuit shown, as modifications will be obvious to one skilled in the art. For example, instead of employing a plurality of primary windings 2, 3, etc., a single primary winding may obviously be employed to supply energy to the secondary windings 10, 11, etc. Features of the invention, believed to be novel, are specifically pointed out in the appended claims.

What is claimed is:

1. In a rectifying system, a source of alternating current, a plurality of input elements supplied with energy from said source, a plurality of closed loops each including one of said elements, a rectifier, and a capacity in series; said loops being connected to each other by arranging said capacities in a series circuit, said elements in any two adjacent loops being oppositely poled, and a load circuit connected to the ends of said series circuit.

2. In a rectifying system, a source of alternating current, a plurality of input elements in energy transfer relation to said source, a plurality of closed loops, each including one of said elements, a rectifier and a capacity in series, said loops being connected to each other by arranging said capacities in a series circuit, said elements in any two adjacent loops being oppositely poled, said rectifiers being similarly poled, and a load circuit connected to terminals of said series circuit.

3. In a rectifying system, a source of alternating current, a plurality of transformer secondary windings coupled to said source, and a separate rectifier connected to one terminal of each secondary winding, said rectifiers together with said secondary windings being connected in a series circuit in which all said rectifiers are conductive in the same direction, and in which adjacent secondary windings are reversed with respect to each other, a separate condenser shunted around each path formed by a given secondary winding and its connected rectifier, and a load circuit connected to the ends of said series circuit.

4. A rectifying system including a plurality of rectifying units in series, each unit being shunted by a capacity and comprising a rectifier and a transformer secondary in series, adjacent rectifiers being similarly poled and adjacent secondaries oppositely poled, a source of alternating current coupled to said secondaries, and a load circuit connected in series with said units.

In witness whereof, I hereunto subscribe my name this 27th day of October, A. D. 1921.

HUMPHREYS OLIVER SIEGMUND.